Nov. 30, 1965 C. STROHMEYER, JR 3,220,193
DEVICES FOR IMPROVING OPERATING FLEXIBILITY OF
STEAM-ELECTRIC GENERATING PLANTS
Filed Jan. 6, 1961 10 Sheets-Sheet 1

*INVENTOR.*
*Charles Strohmeyer, Jr.*
BY
*his ATTORNEY*

INVENTOR.
Charles Strohmeyer, Jr.

Nov. 30, 1965  C. STROHMEYER, JR  3,220,193
DEVICES FOR IMPROVING OPERATING FLEXIBILITY OF
STEAM-ELECTRIC GENERATING PLANTS
Filed Jan. 6, 1961  10 Sheets-Sheet 3

Fig. 3.

INVENTOR.
Charles Strohmeyer, Jr.
BY
his ATTORNEY

Fig. 6. TURBINE LOADING AND STEAM TEMP. CONTROL SYSTEM FOR FIG. 4.

Fig. 5.

INVENTOR.
Charles Strohmeyer, Jr.

BYPASS SYSTEM HEAT BALANCE

| p1 | p2 | a % | a h | b % | b h | c % | d % | d h | e h | f % | f h | Δh1 | g h | r % | r h | k h | Δh2 % | Δh2 h | % | h | Δt2 | EVAP. ONLY | EVAP. & SUPHTR. |
|---|---|---|---|---|---|---|---|---|---|---|---|---|---|---|---|---|---|---|---|---|---|---|---|
| 500 | 60 | 1.1 | 1204 | 28 | 449 | 0 | 30 | 262 | 70 | 28 | 277 | 161 | (444F) 2 | 0.9 | 1204 | 500 | 54 | 0 | 1204 | | 47 | 2.7 | 1425 BTU/LB OUTLET 1.9 |
| 500 | 60 | 4.7 | 1204 | 22 | 449 | 0 | 30 | 262 | 70 | 22 | 274 | 127 | 389 | 2.2 | 1204 | 649 | 204 | 1.1 | 1204 | | 160 | 10.2 | 7.2 |
| 500 | 60 | 8.9 | 1204 | 15 | 449 | 0 | 30 | 262 | 70 | 15 | 271 | 89 | 351 | 3.7 | 1204 | 824 | 380 | 2.4 | 1204 | | 199 | 19.0 | 13.5 |
| 500 | 60 | 10.1 | 1204 | 9 | 449 | 9 | 30 | 262 | 70 | 0 | — | 0 | (239F) 262 | 5.8 | 1204 | 978 | 536 | 5.1 | 1204 | | 202 | 26.8 | 18.5 | p = PRESSURE, PSIA
t = DEGREES FHARENHEIGHT
% = PERCENT OF DESIGN FEEDWATER FLOW
h = ENTHALPY, BTU/LB

*Fig. 8.*

INVENTOR.
Charles Strohmeyer, Jr.
BY
William J. Ruano
his ATTORNEY

Fig.11. DRUM STEAM GENERATOR STARTUP CONTROL SYSTEM

INVENTOR.
Charles Strohmeyer, Jr.
his ATTORNEY

United States Patent Office 3,220,193
Patented Nov. 30, 1965

3,220,193
DEVICES FOR IMPROVING OPERATING FLEXIBILITY OF STEAM-ELECTRIC GENERATING PLANTS
Charles Strohmeyer, Jr., Wyomissing, Pa., assignor to Gilbert Associates, Inc., Reading, Pa.
Filed Jan. 6, 1961, Ser. No. 81,187
12 Claims. (Cl. 60—106)

This invention is a continuation-in-part of U.S. patent application Ser. No. 42,194 filed June 7, 1960.

This invention relates to devices and systems for improving the operating flexibility of steam-electric generating units including steam generator, turbine generator and auxiliary equipment.

An object of the invention is to provide a novel apparatus and a system which will reduce unit start-up time and costs as well as to provide the steam generator with capability to vary primary outlet steam temperature to control the rate of metal temperature rise or fall within the turbine during start-up and shutdown respectively.

A more specific object of the invention is to provide a system for a once-through steam generator whereby start-up flow from the evaporating section and/or furnace waterwalls can be passed through a flash tank before entry to the superheater, the evaporating section and/or furnace waterwalls being maintained at a higher pressure than the flash tank and superheater.

A further specific object of the invention is to provide a novel system for increasing or decreasing heat input into the evaporating and/or furnace waterwall and superheating circuits with respect to a given superheater flow in a once-through steam generator during start-up for the purpose of raising or lowering superheater bypass flow heat in the regenerative feedwater cycle or alternately rejecting a part or all of such bypass flow heat to a heat sump as a condenser, in conjunction with the flash tank system mentioned above and control of furnace firing rate for maintaining the flash tank pressure constant or to a programmed varying value.

A still further specific object of the invention is to provide a novel system for controlling steam generator primary outlet steam temperature during start-up using the above controls in conjunction with steam temperature measurement made within the turbine in a way which will control turbine metal temperature rise within specific limits.

As an alternative for the flash tank system mentioned above, and where a steam and water separator is installed after the evaporating section of a once-through steam generator, a system is provided whereby the flow to the steam and water separator during start-up may be throttled to a lower pressure than is maintained in the evaporating section. This will accomplish essentially the same results as the flash tank system. Where the evaporating section is divided into parallel but separate systems, the throttling and shutoff controls ahead of the steam and water separator may be used during normal operation to balance flow between or among the individual parallel systems. In such case, feedwater control may be obtained by balancing feedwater flow against steam flow, or other indication of output demand on the boiler, using outlet temperature of a portion of the evaporating systems to provide final adjustment of feedwater flow control.

Other objects and advantages of the invention will become more apparent from a study of the following description taken with the accompanying drawings wherein.

GENERAL DESCRIPTION OF PRESENT INVENTION

Generally stated, there are four separate but interrelated control elements involved in the present invention namely;

Item 1.—Where a throttling and shutoff valve system is located between (1) the evaporating and/or furnace waterwall section and (2) the superheater outlet of a once-through steam generator, and by-pass flow to a flash tank is taken from the main flow line ahead of the throttling and shutoff valve system for the purpose of establishing minimum flow through the evaporating and/or furnace waterwall section, such flow to the flash tank being throttled before entry to the flash tank, a flow line is provided from the flash tank to the downstream side of the throttling and shutoff valve system in the main flow line. Various modifications of such system are shown schematically in FIGURES 1a and 1b.

Figure 1A:
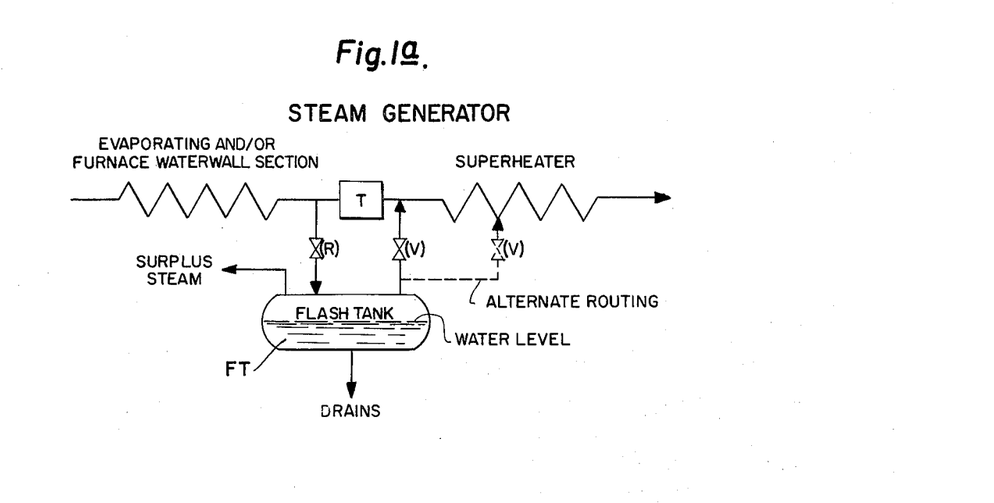
FIGURES 1a and 1b diagram item 1 systems.
Figure 1B:
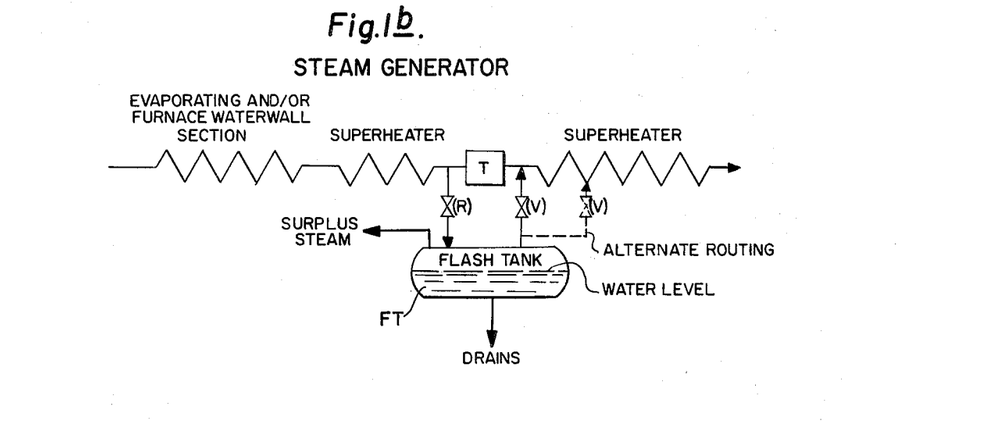

When the throttling and shutoff valve system T in the main flow line is closed, this system permits the superheater to be operated at a lower pressure than that of the evaporating and/or furnace waterwall section. Flow from the flash tank FT to the superheater may or may not be throttled at valve V location as is desired to suit specific requirements. With such a system, steam can be admitted to the superheater and turbine at reduced pressure before the evaporation and/or furnace waterwall section fluid reaches saturation or design temperature at a higher pressure. As the enthalpy of the mixture leaving the evaporating and/or furnace waterwall section increases and rises above the saturation liquid condition or approaches design, the flash tank continues to act as a steam and water separator at lower pressure assuring a source of dry or nearly dry steam to the superheater similar to a drum in a drum steam generator. Recirculation from the flash tank to the steam generator is through the boiler feed pump. Maximum superheater outlet pressure when superheater steam flow is passed through the flash tank, is determined by flash tank design pressure. Thus, in conjunction with low firing rate in the furnace, low temperature, low pressure throttle steam may be admitted to the turbine for cold starts. By increasing firing rate, steam flow may be increased. Start-up time and start-up losses are substantially reduced. This is accomplished by operating the once-through steam generator similar to a drum steam generator during start-up.

Item 2.—This is a system for taking heat output from the evaporating and/or furnace waterwall section as contained in the steam flow or flash tank drain flow and returning such flow to the regenerative feedwater heating cycle or alternately wasting the heat in such flow to a heat sump as a condenser and/or cooler, such flow bypassing the superheater. Various modifications of such system are shown schematically in FIGS. 2a and 2b.

Figure 2A:
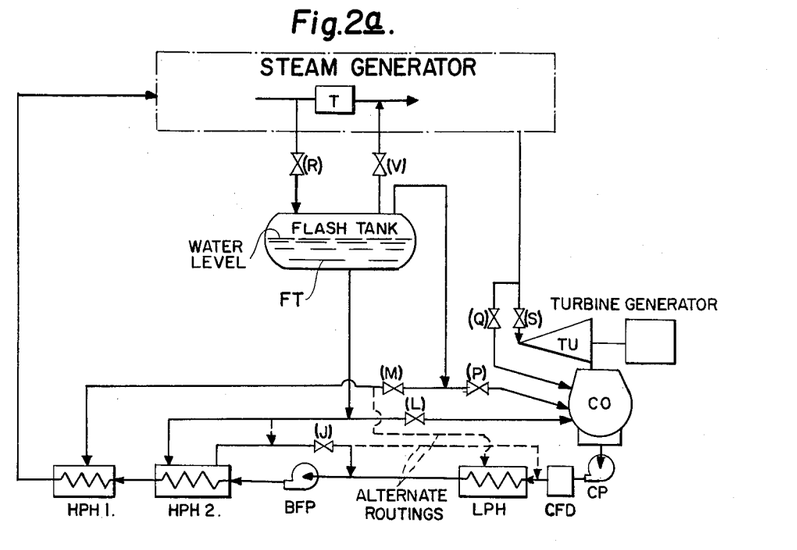
FIGURES 2a and 2b diagram item 2 systems.
Figure 2B:
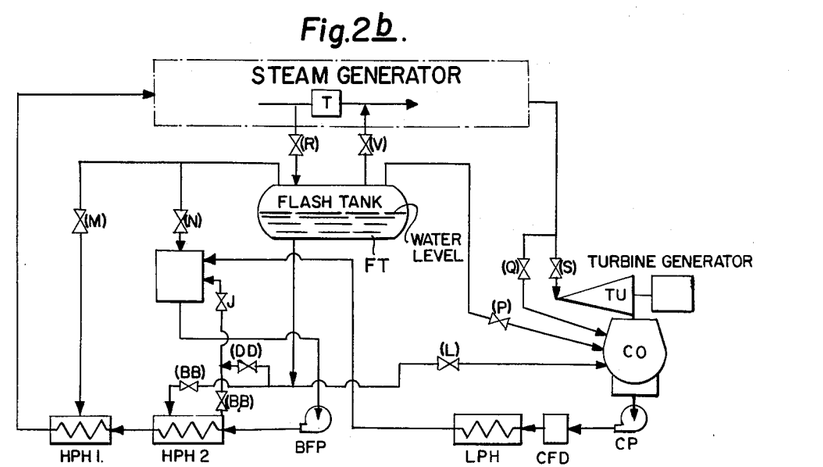

Conservation of superheater bypass flow heat in the feedwater cycle or alternate dissipation of such heat to waste, requires a decrease or increase in furnace firing rate respectively for any given superheater flow. This system decreases or increases heat input to the superheater for any given superheater steam flow to lower or raise superheater metal and steam temperatures. During start-up, superheater metal temperatures can be raised more rapidly and can be controlled to any desired level or rate of temperature change within limits of the heat conservation or rejection system. The range of primary steam temperatures which may be obtained during start-up from a once-through steam generator is broadened considerably.

Item 3.—This is a system for controlling item 1 and item 2 devices during start-up from steam temperature measurements made within the turbine. This system controls steam temperature in the turbine above metal temperature and uses measurement of the rate of turbine metal temperature rise to control steam and metal temperature differentials and/or mass flow of steam through the turbine. Thus, the rate of turbine metal temperature rise can be controlled within pre-set values. This system provides coordinated operation between the steam generator and turbine during start-up so that the steam generator may provide optimum steam conditions for the turbine. The basic elements of such a system are shown schematically in FIG. 5.

Item 4.—This is an alternative for item 1 where the steam generator is provided with a steam and water separator in the main flow line at the discharge from the evaporating section and before the steam enters the superheater. In such a case, during start-up, the steam and water separator may function in a similar way to the flash tank of item 1 by means of a throttling and shutoff valve system installed in the evaporating section discharge before flow enters the steam and water separator. Such throttling and shutoff valve system enables the steam and water separator to be operated at a lower pressure than that of the evaporating section. An application of such system is shown schematically in FIG. 7. Items 2 and 3 may also be used with item 4. The throttling and shutoff valve system alternate arrangements may be the same as those covered in my U.S. Patent application Ser. No. 42,194 filed June 7, 1960.

FIGURES 1a and 1b show different arrangements of the item 1 flash tank system for a once-through steam generator. The steam generator circuits include a throttling and shutoff valve system T between (1) the steam generator evaporating and/or furnace waterwall section and (2) the superheater outlet. During start-up, system T is closed so that no flow can pass through the system. The flash tank system includes a flow line from the upstream side of throttling and shutoff valve system T to a flash tank FT. Throttling valve R reduces pressure of the flow through this line. A flow line is taken from the flash tank FT to the superheater downstream of throttling and shutoff valve system T. Valve V in this line or a by-pass around the same may be used to regulate flow from the flash tank to the superheater or isolate the flash tank from the superheater on the downstream side of throttling and shutoff valve system T. As an alternative, regulation of flow from the flash tank to the superheater may be done at the outlet of the superheater by other supplementary means when valve V or an optional by-pass around valve V or both are in a fixed open position. Surplus steam in the flash tank FT, which is not returned from the flash tank to the superheater, may be used in the regenerative feedwater cycle for heating or may be discharged to a heat sump as a condenser. Drains from the flash tank FT may be returned to the regenerative feedwater cycle or may be discharged to a heat sump as a condenser or cooler.

The throttling and shutoff valve system T when in the closed position, prevents water from entering the superheater through the main flow line from the evaporating and/or waterwall section. When the superheater is isolated from a steam source during unit shutdown, condensate formation in the superheater as a result of superheater metal cooling will be minimized. During start-up, minimum flow through the furnace waterwalls must be approximately ⅓ of rated flow before furnace firing can commence. Closure of throttling and shutoff valve system T when first establishing waterwall flow, will prevent flooding of the superheater with water. During start-up, the waterwalls may be operated at a high pressure level and all of the required minimum flow may be discharged through valve R to the flash tank. After furnace firing has commenced, temperature of the water flowing through the furnace waterwalls will increase and as the pressure is reduced through valve R, steam will flash in the lower pressure flash tank FT. Steam is formed in the flash tank FT before the furnace waterwall fluid reaches saturation or design temperature. The flash tank steam may be admitted to the superheater for warming up the superheater and outlet steam piping. After there has been sufficient heating of the superheater and steam piping, low temperature steam is available for starting a cold turbine. Steam may be admitted to the turbine before the discharge from the evaporating and/or furnace waterwall section contains a substantial amount of vapor. Since steam can be admitted to turbine when the furnace waterwalls are operated at a low heat input level, and before the waterwall metals have had a chance to heat up to normal operating conditions, the time from lightoff of the fires in the furnace to steam admission to the turbine is substantially reduced. Heat losses associated with flow through the superheater or from steam or water discharged from the flash tank to a heat sump as a condenser are minimized. This reduces start-up heat losses.

As steam flow through the turbine and steam generator reheater from the flash tank source is increased, gas temperatures in the superheater and reheater sections may be increased which in turn increases the heat input to the waterwalls. The reheater is optional and is not shown. When steam having the necessary dryness is available on the upstream side of the throttling and shutoff valve system T, valve V and any associated by-pass may be closed, and throttling and shutoff valve system T may be opened in a manner to gradually raise the superheater pressure from flash tank level to approach waterwall level in a way to best accommodate turbine throttle pressure requirements.

FIGS. 2a and 2b show different arrangements of item 2 system whereby start-up minimum flow from the evaporating and/or furnace waterwall section which passes through valve/s R to the flash tank FT, can be returned to the feedwater cycle or alternatively to a heat sump as a condenser CO or other cooler (not shown) before returning to the steam generator. Such flow control decreases or increases furnace heat input required to maintain flash tank FT pressure at a given value for a specified superheater flow.

For primary steam conditions of 2450 p.s.i.g. and 1050 F. there is about 1.1 to 1.4 lbs. of superheater metal for each lb./hr. of design steam flow. During low flow periods this ratio is increased. If there is 10% of design flow through the superheater, there is about 11 to 14 lbs. of superheater metal for each lb./hr. of actual steam flow. Therefore, during start-up periods, to raise superheater outlet steam temperature, enthalpy or both to control rate of metal heating within the turbine, the heat input to the superheater must be considerably above that required to raise the steam temperature alone. The amount of additional heat available to the superheater will determine the rate of superheater metal temperature rise.

In order to increase the heat input to the superheater for any specified superheater steam flow, it is necessary to increase the furnace firing rate. This increase results in an increased heat input to the evaporating and/or furnace waterwall section of the steam generator. In the case where the superheater flow is below that of the evaporating and/or furnace waterwall section, the heat content of the superheater bypass flow to the flash tank will be substantially increased. A portion of this heat can be conserved in the feedwater cycle and the remainder must be dissipated in a heat sump as condenser CO.

When superheater steam flow is below the minimum flow required for the waterwalls, primary outlet steam temperature can be controlled from the firing rate in the furnace, and heat rejection from the flash tank FT will be proportional to changes in firing rate. As firing rate is increased, heat rejection is increased. As firing rate is decreased, heat rejection is decreased.

FIG. 2a shows a flash tank discharge system for the case where the regenerative feedwater cycle does not include a direct contact de-aerating feedwater heater. FIG. 2b shows a flash tank discharge system where the feedwater cycle does include a direct contact de-aerating feedwater heater.

In FIG. 2a, the heat in the flash tank FT drains through valve L may be dissipated in a heat sump as condenser CO before being returned to the steam generator. Alternatively, the flash tank FT drains may be discharged through high pressure heater HPH2 shell and from there discharged through valve J into the condensate supply to the high pressure boiler feed pump BFP. Alternate points of discharge into the condensate system are indicated. Heat transfer from flash tank FT drains to the feedwater in the high pressure heater HPH2 will cool the flash tank FT drains sufficiently so that they will not flash into steam when entering the low pressure condensate system. In such a manner all of the heat in the flash tank drains can be conserved in the feedwater cycle when passing through valve J, or all of the heat can be wasted to the condenser CO when passing through valve L. Flow can be proportioned between valve J and valve L as required to decrease or increase firing rate and superheater metal and steam temperatures.

A similar treatment is possible for steam discharge from flash tank FT. Steam may be discharged to a heat sump as condenser CO through valve P. Heat in the steam may be conserved by condensation in high pressure heater HPH1 to raise the feedwater temperature to approach the saturation temperature of the flash tank. The steam flow to HPH1 through valve M is limited in quantity and depends upon the pressure in flash tank FT and the temperature of the feedwater entering HPH1.

Maximum feedwater heating in HPH1 is normally desired when starting up a unit so as to minimize temperature rise from the steam generator feedwater inlet to the outlet of the evaporating and/or furnace waterwall section. It is normally preferable to dissipate the heat in the flash drains rather than the heat in the flash tank steam. Returning the liquid to the condenser through valve L permits removal of feedwater contamination and solids in the condensate filter-demineralizer CFD where installed downstream of condensate pump CP. Superheater outlet steam flow may bypass the turbine TU, flowing to condenser CO through valve Q.

In FIG. 2a, flash tank FT drain flow through high pressure heater HPH2 shell is optional. The flash tank FT drain flow would pass directly from the flash tank FT through valve J to the low pressure condensate system. In this case flow through valve J would have to be limited so as to maintain the condensate entering the boiler feed pump BFP suction at a sufficiently low temperature to assure proper boiler feed pump BFP net positive suction head.

The description for FIG. 2b is similar to that of FIG. 2a with the following exceptions:

Flash tank FT steam may be supplied to the de-aerator DE through valve N to maintain the de-aerator at a specific pressure. Flash tank FT drain flow may be passed through the high pressure heater HPH2 shell through valve J to the de-aerator DE. Alternately drain flow from flash tank FT may by-pass the high pressure heater HPH2 shell through valves DD and J in series to the de-aerator DE. Valve/s BB isolate the high pressure heater HPH2 from the flash tank FT drain flow. A similar high pressure heater HPH2 arrangement could be used for FIG. 2a.

The location of valve J is shown downstream of high pressure heater HPH2 to minimize flashing and loss of temperature before the high pressure heater HPH2.

Figure 3:
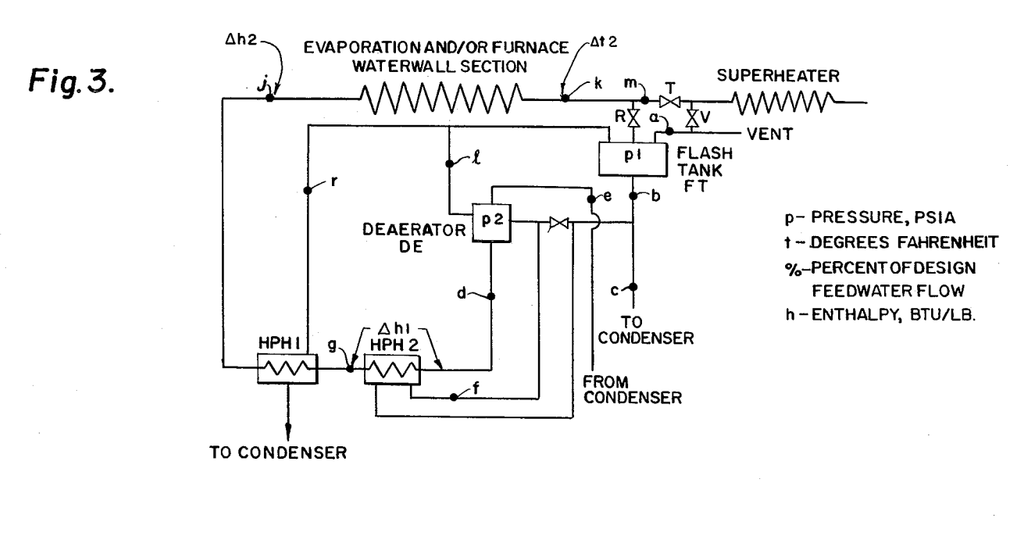
FIGURE 3 diagrams items 1 and 2 systems and tabulates heat balance values for various start-up conditions.

FIG. 3 diagram shows a combination of FIGS. 1a and 2b features. Typical steady state heat balance conditions are tabulated for various superheater bypass flow conditions. The table is self-explanatory. It can be seen from FIG. 3, when starting to warm up the steam generator, there is negligible heat rejection to the condenser. The greatest portion of the heat absorbed by the steam generator can be utilized to heat up the unit, building up normal operating temperatures in the shortest possible time. When a de-aerator is provided in the feedwater cycle, such an arrangement assures that steam is available for de-aeration before substantial condensate flow is returned from the condenser to the de-aerator. This protects the steam generator from oxygen contamination. There should be no flow from the condenser to the steam generator until the turbine shaft is properly sealed and there is adequate vacuum in the condenser to assure that the condensate effluent from the condenser is at sufficiently low temperature so that it may be passed through condensate filter-demineralizers at the outlet of the condenser for feedwater purification purposes. This prevents contaminating the steam generator during the start-up cycle and minimizes the time required to purge the evaporating and/or furnace waterwall system prior to steam admission to the turbine to start it rolling. Protection of the steam generator from contamination during start-up provides additional protection for the superheater and prevents dangerous deposits from building up on the internal superheater surfaces which could result in overheating and over stressing of the metals.

Figure 4:
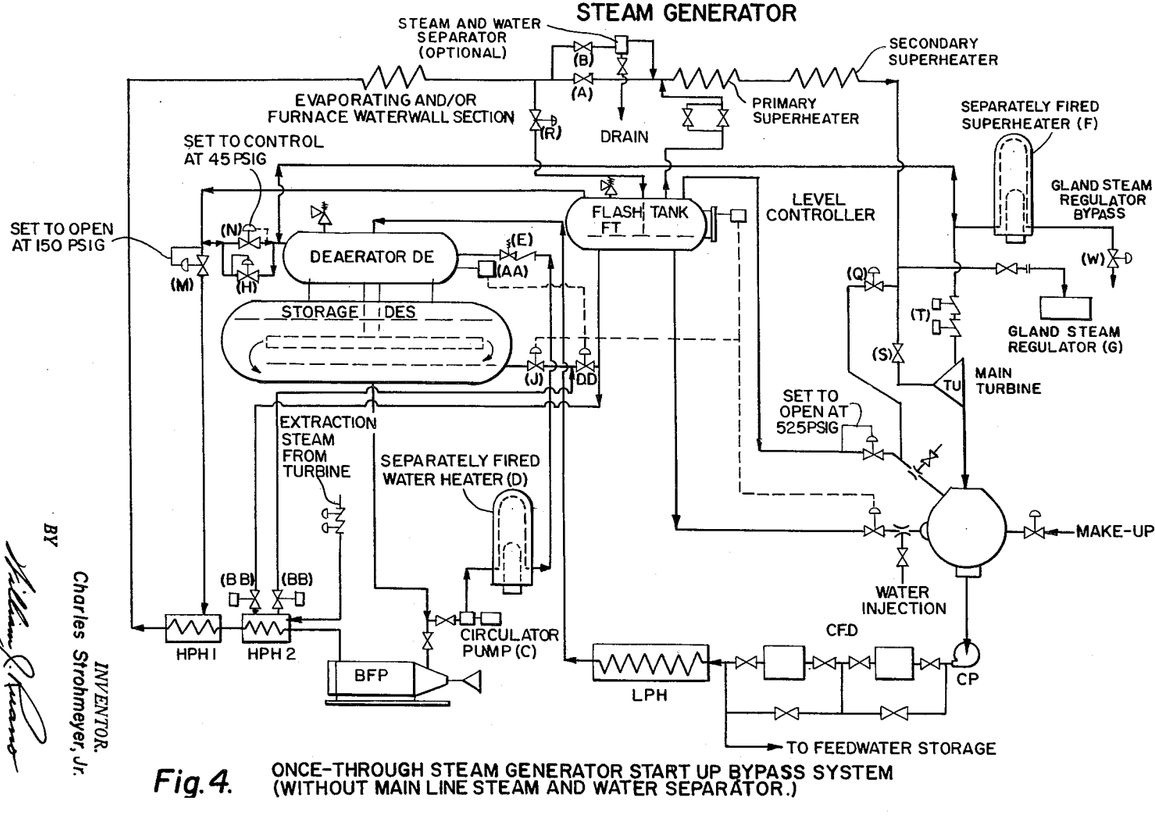
FIGURE 4 is an application example of items 1 and 2 systems.

FIG. 4 shows a typical specific application of the items 1 and 2 systems as applied to the overall once-through steam generator, turbine generator and feedwater cycle. Steam conditions for the cycle shown are 2450 p.s.i.g., 1050 F. at the superheater outlet and 1000 F. at the reheater outlet (not shown). The same system will apply to a wide range of steam pressure and temperature conditions. Valves A and B comprise the throttling and shutoff valve system T referred to above. After a unit is shut down, valves A and B are closed to prevent steam leakage from the waterwalls to the superheater, thus, minimizing condensation in the superheater as the metal temperatures are lowered.

The de-aerator DE pressure is raised to approximately 60 p.s.i.a. (293 F.) prior to start-up. This is done by circulating water from the de-aerator storage tank DES, through circulator pump C, separately fired water heater D and back to the de-aerator DE. Back pressure valve E prevents the hot water from flashing on hot water heater D side of the back-pressure valve.

With 293 F. feedwater in the d-aerator storage tank, DES there is sufficient heat accumulation in the de-aerator unit to supply sealing steam to the turbine shaft. Sealing steam is taken from the de-aerator extraction steam supply line on the de-aerator side of the non-return valves T. The temperature of the steam to the gland steam regulator G by-pass W is controlled at the outlet of the separately fired superheater F so that the turbine steam and metal differential temperatures are at a minimum. Circulation from de-aerator DE through hot water heater D maintains pressure in the de-aerator DE.

After the turbine shaft is sealed, the mechanical vacuum pump (not shown) is started to draw vacuum on the condenser.

The feed pump BFP is started and approximately ⅓ of rated flow circulation is established from the de-aerator DE to the high pressure heaters HPH1 and HPH2 and boiler waterwalls, through the superheater by-pass control valve to the flash tank FT and back to the de-aerator storage tank DES through control valve J. Motor operated valves BB are shut and valve DD is open.

When minimum flow water circulation is established at operating pressure, burners are lit off in the furnace. Rate of firing is controlled so that the temperature of the gas entering the superheater does not exceed 1000° F. Pressure in the flash tank FT is maintained at a minimum pressure corresponding to de-aerator DE pressure through the stop check valve H. Thus, water may be returned from the flash tank FT to the de-aerator storage tank DES by gravity at the commencement of start-up.

As the enthalpy of the flash tank drains increases, pressure rises in the de-aerator. Valves BB are gradually opened. Valve DD, through controller AA, prevents de-aerator pressure from exceeding a set limit. As de-aerator pressure increases, valve DD closes and flow through valves BB increases. There is no heat rejection to the condenser CO from the flash tank drains at this time.

After flash tank drain flow through the high pressure heaters is up to temperature at the de-aerator side and is stabilized, valve DD is locked in the shut position and valve N adds steam to the de-aerator from the flash tank to prevent the de-aerator pressure from falling below approximately 60 p.s.i.a. When valves BB open, they are interlocked with positive closing non-return valves CC in the steam extraction lines from the turbine to keep the non-return valves tight shut to prevent water flowing back to the turbine. Valve M supplies flash tank steam to the highest pressure feedwater heater HPH1 to maximize the temperature of the feedwater entering the steam generator.

While building up temperature in the waterwalls, steam from the flash tank FT may be injected into the primary superheater inlet through valve V after the superheater metal temperature rises above that for saturation at operating pressure. The pressure and quantity of steam flow to the superheater is regulated by means of valve Q in conjunction with control of firing rate and heat rejection to the condenser through valves L or P.

Superheater outlet steam flow can also be sent direct to the main turbine TU through throttle/stop valve S after warm-up of the main steam line. Steam flow to the turbine from the flash tank is increased up to about ten (10%) percent of rated flow by increase of firing rate which can be controlled from flash tank pressure to maintain a set value as 500 p.s.i.g. Valve P acts as a relief valve to prevent the flash tank pressure from rising above design.

The once-through steam generator is operated essentially as a forced or controlled circulation drum steam generator during start-up. The flash tank FT serves as a drum and the de-aerator and high pressure heaters are incorporated in the water circulating circuit. However, the flash tank design pressure is substantially below that required for a drum boiler having similar steam conditions. The boiler feed pump is the circulator. Pressure in the superheater from the flash tank steam source may be raised to the maximum design pressure of the flash tank.

As flow is established through the turbine and reheater (not shown), gas temperatures in the furnace to the superheater can be raised above 1000° F. to raise steam temperature and produce approximately dry saturated steam leaving the waterwalls. This permits increasing firing rate in the furnace and quickens hot starts. For cold starts, the rise of temperature in the waterwalls may be delayed to produce low temperature throttle steam, minimizing heat rejection losses to the condenser when slowly warming up the turbine.

Before steam flow from the waterwalls enters the superheater directly through valves A or B, it is desirable to dry up the steam at the waterwall outlet. Before valves A or B can be opened to increase the steam flow to the superheater above the approximate ten (10%) percent of rated flow limit from the flash tank FT, firing rate and heat rejection to condenser CO must both be increased. To accelerate this process, valve J is closed gradually. Level in the flash tank FT rises and the drains are diverted to the condenser CO through valve L. Also, steam flow from flash tank FT to the feedwater heaters HPH1 and DE is increased. Valves BB are closed and the heater shells are drained preparatory for or in conjunction with steam admission from the turbine extraction system. Surplus steam from flash tank FT will flow through valve P to condenser CO. Steam flow to the turbine from the flash tank is limited by the tank design pressure and capacity of valve V. When the discharge from the waterwalls is essentially dry steam, control valve B set point is adjusted slightly below flash tank pressure. Valve V is shut, transferring control of superheater steam flow at constant pressure over to valve B. Valve Q is closed completely. Superheater steam flow and pressure are further regulated by valves A and B as required.

With respect to cycle clean-up, the feedwater is chemically buffered and there will be no corrosion on the water side of the heater and boiler system after shut-down. The deaerator DE is under pressure so that the storage tank DES cannot be contaminated with oxygen. The flash tank FT is always under pressure and concentrations will not build up with proper venting. Silica that washes out of the turbine TU during start-up and other concentrations from condenser CO are removed in the full flow condensate filter-demineralizer CFD. Having vacuum in the condenser CO prior to re-circulation through the condenser minimizes cycle contamination from oxygen. Since the steam side of the low pressure closed feedwater heaters LPH can become contaminated with oxygen after shut-down, the drains are returned to the condenser for a short period of time when the unit is started up. Contamination will thus be removed in the condensate filter-demineralizer CFD. The high pressure heaters HPH2 used as drain coolers for the flash tank drains are blanketed with condensated on the shell side during shut-down for a hot restart.

During a load dump of the turbine, the boiler can be kept in operation at reduced firing rate by discharging steam through valve Q to condenser CO. This cools the superheater. Valve A is closed and valve B is throttled to control superheated outlet steam to desired enthalpy. Valve R opens to provide the balance of the minimum flow for the waterwalls. The flash tank drains through valve L to the condenser. Steam from the flash tank FT is used in the deaerator DE and high pressure heaters HPH2 for feedwater heating. The boiler is thus in a standby operating state, ready to immediately admit hot steam to the turbine for re-start. If it is necessary to cut back firing rate to protect the reheater (not shown), valves A and B can be closed completely and steam flow to the superheater can be obtained by opening valve V.

Figure 5:
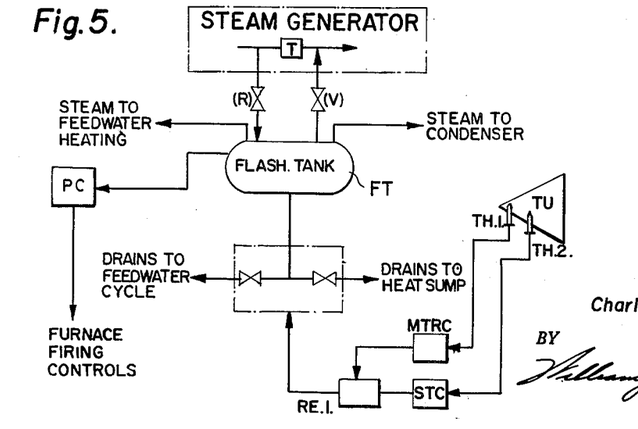
FIGURE 5 diagrams item 3 system applied to items 1 and 2.

FIGURE 5 is a simplified diagram of the item 3 control system. Steam temperature within the turbine flow path is measured by element TH1 which feeds an impulse into steam temperature controller STC. This controller sends a signal to the steam generator temperature control system TC through relay RE1 to control turbine steam flow to a specified temperature value.

Another temperature measurement at TH2 is recorded and controls rate of metal temperature rise in the turbine within specified limits. TH2 feeds into controller MTRC which in turn feeds into relay RE1 so as to over-ride the signal from steam temperature controller STC. The signal from steam temperature controller STC to the steam generator temperature controls has priority until rate of metal temperature rise controller MTRC approaches a limit point in which case the signal from MTRC takes precedence.

In FIGURE 5, the turbine temperature controllers STC and MTRC feed into a steam generator temperature control system TC which proportions flash tank FT drain flow between the feedwater cycle for minimum heat losses and a heat sump as a condenser for maximizing heat losses. As the flash tank drains are returned to the feedwater cycle, steam flow from the flash tank FT for feedwater heating is minimized and pressure will rise in the flash tank FT. Pressure controller PC correspondingly reduces firing rate. As the flash tank drains are diverted to the heat sump, additional steam from the flash tank FT is required for feedwater heating and flash tank FT pressure will decrease. Pressure controller PC will increase firing rate accordingly.

As an alternate to FIGURE 5, it would be possible for a signal from relay REI to be fed to the firing rate controls to increase or decrease firing rate as necessary to satisfy steam temperature controller STC and rate or metal temperature rise controller MTRC requirements. In such case, pressure controller PC would regulate temperature control station TC to divert the flash tank drains to either the feedwater cycle or the heat sump to maintain a specified flash tank FT pressure.

Figure 6:
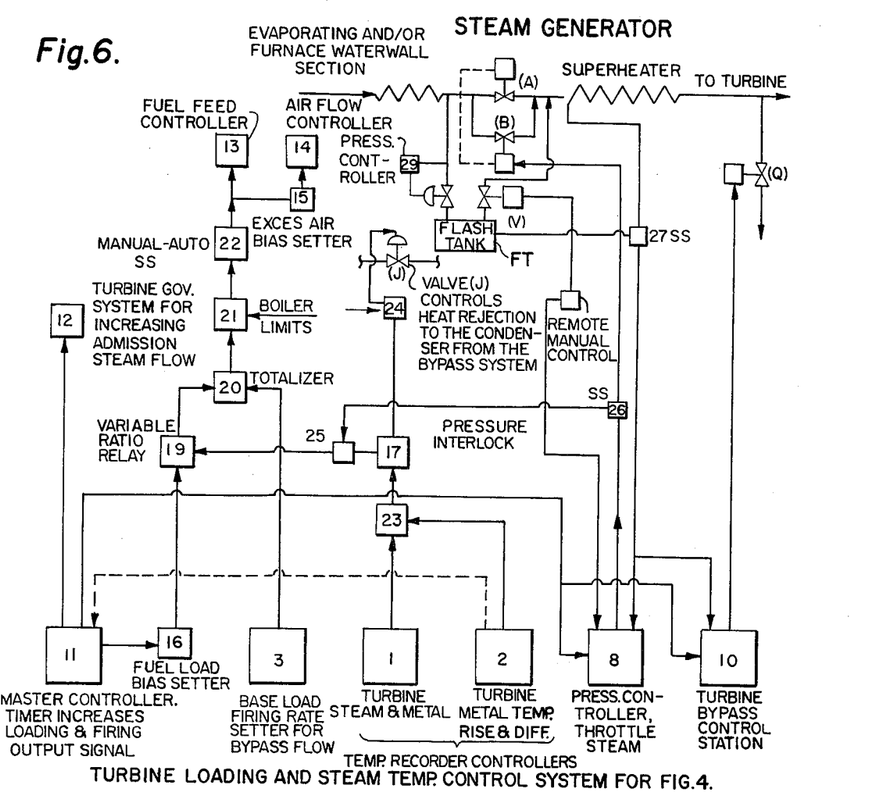
FIGURE 6 is an application example of the item 3 system as applied to items 1 and 2.

FIGURE 6 is a practical application of the item 3 control system for FIGURE 5. Prior to steam admission to the turbine, the steam generator is manually controlled. Firing rate is adjusted from base load setter 3. After steam is admitted through BP2 from the flash tank FT through valves V and Q in series, steam temperature at the superheater outlet is adjusted by manual control of firing rate at 3 and flow through valve J at 24. Valve R controls upstream pressure in the evaporating circuits. Set point may be adjusted at 29. Valves A and B are closed. Valve V is open. Valve Q is initially set in a fixed open position. If high pressure limits are exceeded, valve Q will open further for relief purposes.

When bringing the turbine up to speed, the controls remain on manual. Manual adjustments can be made on the turbine by-pass control station 10 as required to increase BP2 flow. BP2 discharges to the condenser (not shown). After the turbine (not shown) is synchronized, master controller 11 is placed on automatic. The timer in 11 increases the loading signal to turbine governor 12 and the automatic combustion control fuel feed and air flow controllers 13 and 14. Excess air may be biased at 15. Firing rate and generator load increases may be biased at 16.

After transfer from throttle valve to governor valve control, controller 1 responding to the reduced steam temperature in the turbine sends an impulse to relay 17. Relay 17 through 24 closes valve J to increase heat rejection to the condenser. At the same time, relay 17 increases the output from variable ratio relay 19 increasing the signal to firing rate controls 13 and 14.

Pressure controller 8 is characterized so as to have a specific value for any given turbine load. Increases in heat rejection to the condenser must be accompanied by increases in firing rate and vice versa. Pressure controller 8 through selector switch 26 to 25 maintains the proper balance between flash tank pressure through 27 and firing rate at all times when flow to the superheater originates from the flash tank, valves A and B being closed and valve V being open.

The signal from 17 to 19 is anticipation of pressure change. At such time, flash tank pressure will be controlled constant at approximately 500 p.s.i.g. Signals to 13 and 14 from 3 and 19 are totalized by relay 20. Relay 21 receiving signals from boiler protective limits as tube metal temperatures, decreases or increases firing rate as required. Station 22 is a manual-automatic selector switch which can be used in event of failure of upstream controls.

Variable ratio relay 19 normally has a ratio of 1 to 1. As 17 or 25 call for an increase in firing rate, the ratio of the output signal is increased above the input signal. The increase in firing rate permissible to increase steam temperature is limited by the maximum multiplier setting of relay 19. Increase in firing rate for temperature control is small for low turbine loads when the maximum multiplier is, for example, 2. The rate of firing increase for steam temperature control increases with turbine load. Such arrangement will protect the steam generator from excessive firing and temperature rise during low flows.

As superheater outlet steam enthalpy increases in response to controller 1, turbine metal temperatures rise. Controller 2 measures rate of metal temperature rise and metal temperature differential. As limits are approached, controller 2 sends a signal to 23 which decreases the signal from controller 1. When the limits of controller 2 are exceeded, corrective action at 23 is accelerated and the timer in master controller 11 is stopped until the high limits of controller 2 are restored. Thus, increase of mass flow of steam to the turbine is temporarily stopped until the rate of metal temperature rise is diminished.

When the unit is placed on automatic loading after synchronizing, throttle steam pressure controller 8 set point is constant until approximately 10% flow when valves B are set to control downsteam pressure and valves V are closed. Generator load from master controller 11 now gradually increases pressure set point of 8 until maximum pressure is reached at about ⅓ load. At this time, valve A is opened and locked in the open position.

Generator loading signal from master controller 11 can be used to close by-pass valve Q through controller 10 at an appropriate time.

The arrangement shown on FIGURE 6 is not intended to be restrictive. Any number of control units can be combined or re-arranged to duplicate the functions described above in whole or in part. Portions of the control system could be omitted or added to, depending upon the specific steam generator and turbine designs. FIGURE 6, in general, illustrates the control principles involved.

Figure 7:
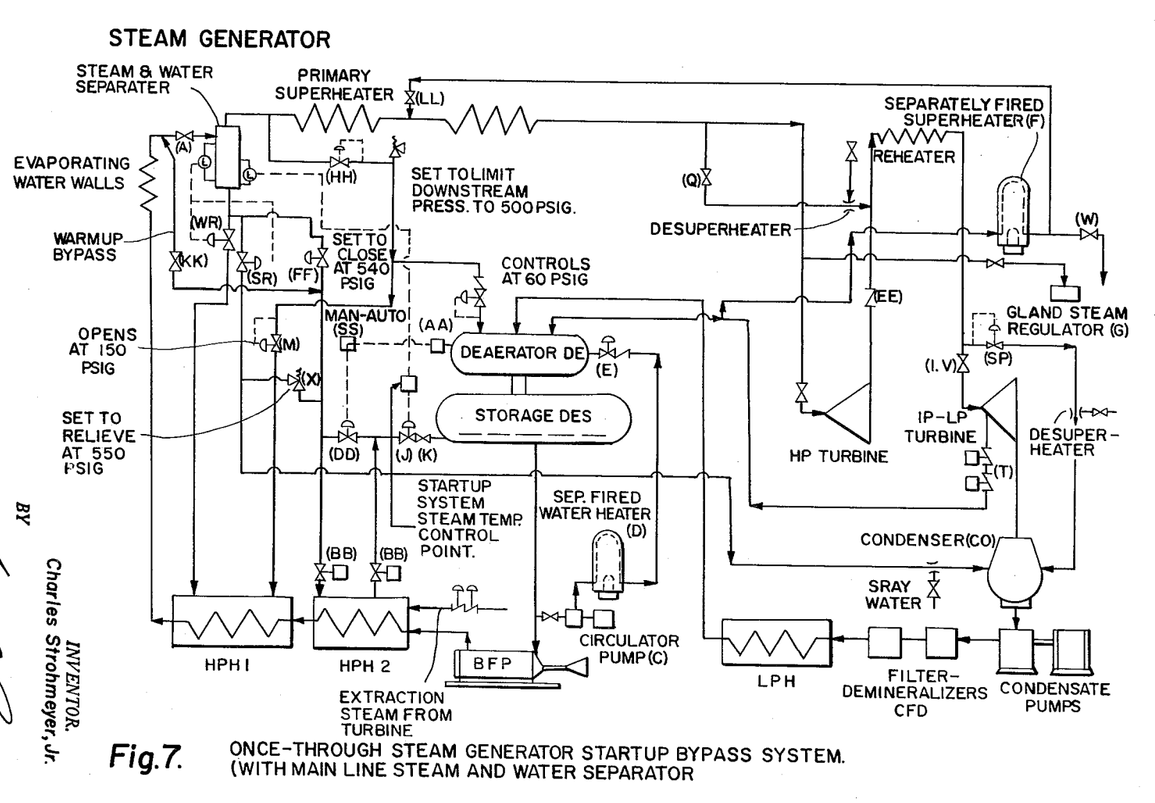
FIGURE 7 is a diagram and application example of the item 4 systems.

FIGURE 7 shows the item 4 system both diagrammatically and as a practical application. Steam conditions for the cycle shown are 2450 p.s.i.g., 1050 F. at the superheater outlet and 1000 F. at the reheater outlet. The same system will apply to a wide range of steam pressure and temperature conditions. A steam and water separator is located at the discharge of the waterwalls or evaporating section before the steam enters the superheater. There may be multiple steam and water separators depending upon the arrangement of the waterwall tube systems. Valve/s A are equivalent to the throttling and shutoff valve system T referred to above. During start-up, when pressure is reduced at the outlet of the evaporating section before the steam and water separator through valve A, the steam and water separator performs in a similar manner to the flash tank described above. During start-up the steam and water separator drains are controlled by valves SR and J or any other combination of required valves. The drains may be discharged to a heat sump as a condenser (through control valve SR), or to the feedwater cycle as shown on FIGURES 2a and 2b (through valve J). The operation of valve DD and valve BB circuits is similar to that described above for FIGURES 2b and 4. Steam is supplied for feedwater heating from the steam and water separator steam space or discharge piping through pressure control valve HH. Valve N controls steam pressure to the deaerator and valve M controls steam pressure to the high pressure heater.

The turbine by-pass valve Q discharges to the re-heat inlet piping. Spill-over valve SP permits the re-heater discharge flow to exhaust to the condenser. The following is a description of a possible method of start-up operation for FIGURE 7.

(A) *Initial conditions prior to start-up: Steam generator waterwalls and turbine high pressure inner casing 300 F. or above*

(1) Prior to start-up, raise deaerator pressure to 60 p.s.i.g. by starting circulating pump C and firing heater D after establishing high water level in the deaerator storage tank DES.

(2) Pressurize superheater with steam through valve LL if superheater pressure is below deaerator pressure. (Superheater could be pressurized up to 500 p.s.i.g.)

(3) Seal the turbine glands with deaerator steam supply through heater F and by-pass valve W. Full vacuum on the condenser with mechanical vacuum pump (not shown).

(4) Set valve A to control upstream waterwall pressure at 2400 p.s.i.g.

(5) Close WR valve until operation of start-up system is discontinued, set SR and J valves to control steam and water separator level, set valve Q to open at 100 p.s.i.g. (or higher pressure depending upon waterwall initial temperature), set valve SP to open in the range of 25 p.s.i.g., open valve FF (steam and water separator pressure must be 500 p.s.i.g. or below).

(6) Light off pilot torches, start boiler feed pump and establish approximately ⅓ flow through the waterwalls; immediately thereafter, commence oil firing at from 10 to 14 percent of design rating.

(7) The HPH2 heaters are flooded with condensate during shutdown; after start-up, valves BB are opened slowly and the steam and water separator drains are returned to the deaerator storage tank DES through the steam space of the HPH2 heater as back pressure is increased across valve DD. Valves CC prevent condensate from flowing from the heater shell to the turbine through the extraction steam line.

(8) Loss of condensate in the deaerator storage tank DES is restored as required when steam through valve HH is available for heating the condensate returns to the deaerator DE without loss of deaerator pressure.

(9) As waterwall temperature increases, valve Q set point is raised to 500 p.s.i.g. and valve SP set point is raised to 125 p.s.i.g. During warmup when raising separator pressure, vent flows through the superheater will be adequate if gas temperature at the inlet to the superheater is limited to 1000 F. In such case valves Q and SP are closed.

(10) Valve J is closed as required to control steam generator water solids concentrations and to raise superheater outlet steam temperature to match turbine metal temperature requirements for steam admission to the turbine. As valve J is closed, steam and water separator water level increases opening valve SR which wastes heat to the condenser. Firing rate is adjusted to hold the steam and water separator at 500 p.s.i.g.

(11) Steam is admitted to roll the turbine and bring it up to speed. Valve J opening and firing rate are adjusted to establish proper turbine steam temperature during rolling. Interceptor valve IV controls are interlocked so they will parallel governor valve opening and throttling when there is possibility of flow through the reheater (valves Q and SP open).

(12) After synchronizing, turbine and boiler loading and steam temperature control are placed on automatic. Valve J opening controls superheater pressure, superheater pressure controls firing rate. Superheater pressure is programmed to increase with load.

(B) *Initial conditioning before start-up: Steam generator and turbine at ambient temperature—cold start*

(1) The steam generator may be preheated before lighting off the fires in the furnace as follows:

(a) Pull vacuum on the deaerator with the mechanical vacuum pump (not shown) and minimize venting thereafter.

(b) Heat deaerator storage tank to approximately 150° F. with circulator pump C and separately fired water heater D.

(c) Close valve A, open valve KK and recirculate feedwater from the deaerator storage tank DES, through the boiler feed pump BFP, high pressure heaters HPH2 and HPH1, waterwalls, through valve KK direct to the deaerator storage tank DES. The start-up motor driven boiler feed pump outlet control valve supplies feedwater at constant pressure to the boiler. The pump minimum flow returns to the deaerator storage tank (not shown) will raise deaerator pressure as will continued flow through heater D.

(d) Regulate throttling valves to individual monotube circuit groups (not shown) to balance outlet temperatures to the steam and water separator/s.

(e) Continue heating entire system until deaerator pressure reaches 15 p.s.i.g.

(2) Set valve A to control upstream waterwall pressure at approximately 2400 p.s.i.g.

(3) Close WR valve, set SR valve to control steam and water separator level.

(4) Light off pilot torches, start B.F. pump and establish ⅓ flow through the waterwalls, immediately thereafter commerce oil firing at approximately 10 percent of design rating.

(5) Valve SP controls separator level until the steam pressure in the steam and water separator increases sufficiently to return the drains to the deaerator storage tank. Valve FF is opened and the separator low level control is transferred over to valve J. During this period condensate from the condenser CO hotwell may be returned to the deaerator allowing the deaerator pressure to decay. Flow from the steam and water separator is gradually transferred from the condenser to the deaerator before complete collapse of deaerator pressure occurs. The deaerator is continuously vented to the mechanical vacuum pump system (not shown). As pressure subsequently builds up to 60 p.s.i.g. in the deaerator, valves BB are opened slowly and the steam and water separator drains are returned to the deaerator tank through the steam space of the heaters HPH2 when back pressure is increased across valve DD.

(6) Seal the turbine glands with deaerator steam supply through heater F and gland steam regulator G by-pass valve W. Pull vacuum on the condenser with the mechanical vacuum pump (not shown). (This operation may be started earlier if an external steam supply is available.)

(7) Gas temperatures to the superheater are held below 1000 F. by limiting firing rate. Therefore, valves Q and SP are locked shut.

(8) Low pressure, low temperature steam is admitted to roll the turbine and bring it up to speed. Initial control of metal temperature rise in the turbine is accomplished by controlling steam pressure rise. Since the reheater by-pass is not required, the turbine 1st stage pressure will be close to condenser vacuum when rolling. Therefore, saturation steam temperature will be slightly above metal temperature at all times, eliminating high differential temperatures from forming across metal cross sections as a result of excessively high saturated steam temperature.

(9) Valve J is closed as required to control boiler water solids concentrations and to raise superheater outlet steam temperature to control metal heating in the turbine by causing steam and water separator drains to be diverted to the condenser CO. Firing rate is adjusted to hold the steam and water separator at 500 p.s.i.g.

(10) After synchronizing, turbine and boiler loading and steam temperature control are placed on automatic.

(C) *Alternate for B above*

(1) Instead of preheating the waterwalls as described in B (1) above, the deaerator and waterwalls can be in a cold state at time of furnace light off after establishing one third flow in the waterwalls. The separator drains are initially returned to the condenser. Vacuum is pulled on the deaerator and the steam and water separator drains are returned to the deaerator as soon as possible after commencement of furnace firing. No charge in piping or controls will be required for this method of operation.

(D) *Flooded superheater after hydrostatic test or shutdown preservation*

(1) The superheater will be dried out in the same manner as would be done for a drum boiler.

Similar results could be obtained for the FIGURE 2a system in combination with the item 4 system, where the deaerator is omitted. Drain flow from the steam and water separator through the high pressure heater shell before entry to the deaerator or low pressure condensate system is optional. Omission of drain cooling before the deaerator, however, reduces the amount of by-pass drain system heat that can be conserved in the regenerative feed water cycle for primary outlet steam temperature control purposes.

Figure 8:
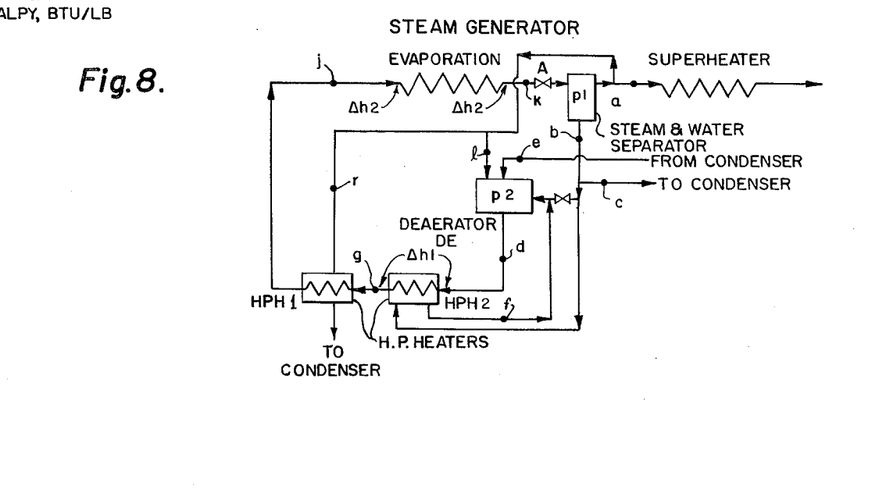
FIGURE 8 diagrams item 4 systems in conjunction with 2 systems, and tabulates heat balance values for various start-up conditions.

FIGURE 8 is a simplified diagram and heat balance of FIGURE 7 for various steady state start-up conditions. The tabulation in FIGURE 8 is self-explanatory and accomplishes the same objectives as FIGURE 3 described above.

Figure 9:
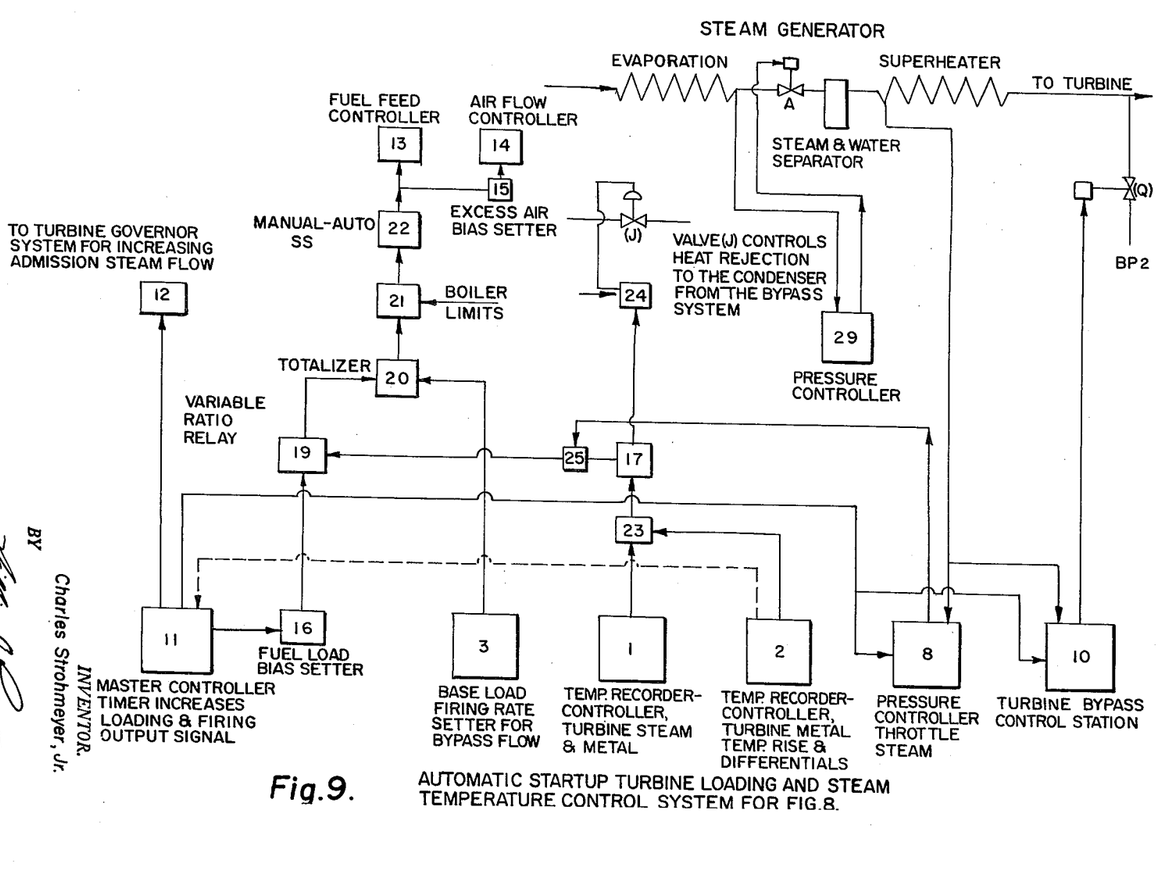
FIGURE 9 is an application example of the item 3 system as applied to items 2 and 4.

FIGURE 9 is a representative application of the item control system as applied to item 4 embodying the general principles outlined in FIGURE 5. The arrangement shown in FIGURE 9 is not intended to be restrictive. Any number of control units can be combined or rearranged to duplicate the functions described below in whole or in part. Portions of the control system could be omitted or added to, depending upon the specific steam generator and turbine designs. FIGURE 9 illustrates the general principles involved.

For FIGURE 9, the steam generator is on manual control prior to steam admission to the turbine. Firing rate is controlled from base load setter 3. After steam is admitted through BP2 through valves A and Q and series, steam temperature at the superheater outlet is adjusted by manual control of firing rate at 3 and flow through valve J at 24. Valve A controls upstream pressure in the evaporating circuits. Set point may be adjusted at 29. Valve Q is initially set in a fixed open position. If high pressure limits are exceeded, valve Q will open further for relief purposes.

When bringing the turbine up to speed, the controls remain on manual. Adjustment can be made to the turbine by-pass control station 10 as required to increase BP2 flow. After the turbine generator is synchronized, master controller 11 is placed on automatic. The timer in 11 increases the loading signal to turbine governor 12 and automatic combustion control fuel feed and air flow controllers 13 and 14. Excess air may be biased at 15. Firing rate and generator load increases may be biased at 16.

After transfer from throttle valve to governor valve control, controller 1 responding to the reduced steam temperature in the turbine sends an impulse to relay 17. Relay 17 through 24 opens valve L to increase heat rejection to the condenser. At the same time, relay 17 increases the output from variable ratio relay 19, increasing the signal to firing rate controllers 13 and 14.

Pressure controller 8 is characterized so as to have a specific pressure control point for any given turbine load. Increases in heat rejection to the condenser must be accompanied by increases in firing rate and vice-versa. Pressure controller 8 at 25 maintains the proper balance between pressure and firing rate as final control. The signal from 17 to 19 is anticipation.

Signals to 13 and 14 from 3 and 19 are totalized by relay 20. Relay 21 receiving signals from boiler limits decreases or increases firing rate as required. Station 22 is a manual-automatic selector switch which can be used in the event of failure of upstream controls.

Variable ratio relay 19 normally has a ratio of one to one. As 17 or 25 call for an increase in firing rate, the ratio of the output signal of 19 is increased above the input signal. The increase in firing rate permissible is limited by the maximum multiplier setting of 19. Increase in firing rate for temperature control is small for low turbine loads where the maximum multiplier is, for example, two. The rate of firing increase for steam temperature control increases with turbine load. Such an arrangement will protect the steam generator against overfiring the furnace.

As superheater outlet steam enthalpy increases in response to controller 1, turbine metal temperatures rise. Controller 2 measures rate of metal temperature rise and metal temperature differentials. As the limits of controller 2 are approached, controller 2 sends a signal to 23 which decreases the signal from 1. When the limits of 2 are exceeded, corrective action at 23 reverses controller 1 action and the timer in master controller 11 is stopped until the limits of 2 are restored. This holds mass flow of steam to the turbine constant.

When the control is placed on automatic after synchronizing, throttle steam pressure controller 8 is also placed on automatic. Generator load from master controller 11 gradually increases the set point of 8 until near design superheater outlet pressure is reached at about ⅓ load. At this time, valve A is opened and locked in the open position. Generator load from master controller 11 can be used to close by-pass valve Q through controller 10 in an appropriate manner.

Figure 10:
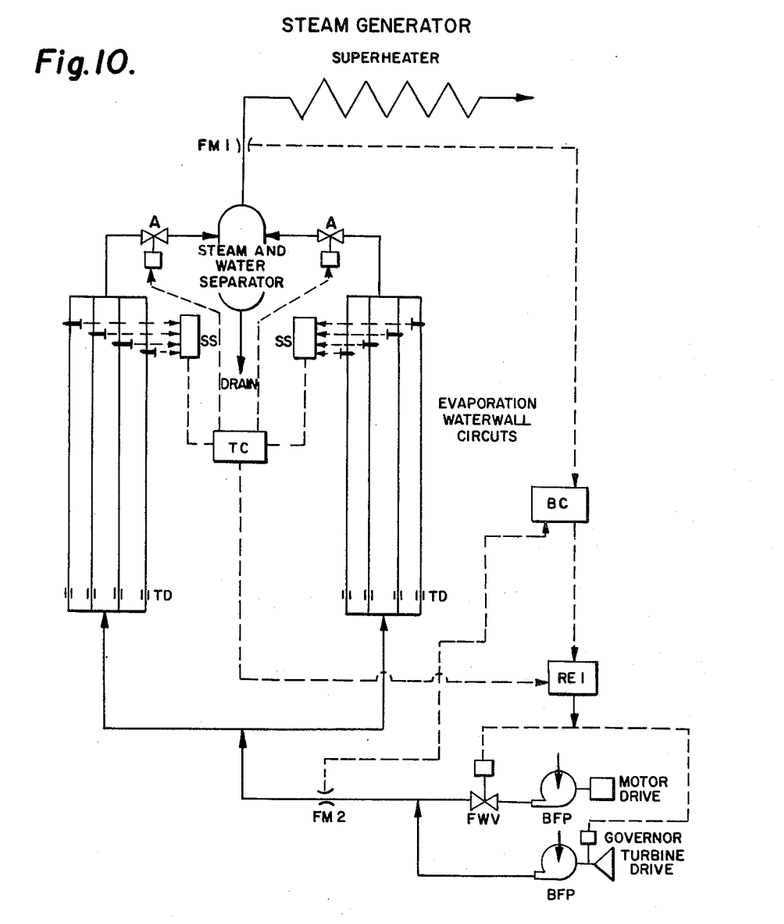
FIGURE 10 is a diagram of flow balancing and feedwater control for item 4 systems; and,
 FIGURE 11 is a diagram and control application of items 1, 2, and 3 system principles as they would apply to a drum steam generator.

FIGURE 10 shows a feedwater flow control system for the steam generator arrangement shown on FIGURE 7 embodying item 4 principles. This boiler has multiple parallel waterwall evaporating flow systems, each having a throttling and shutoff valve A with discharge line to the steam and water separator. For control of feedwater flow, steam and water separator outlet steam flow measured by flow meter FM1 is balanced against feedwater flow to the individual waterwall flow systems measured by flow meter FM2 at balancing controller BC. Controller BC sends an impulse through relay RE1 to either a feedwater control valve FWV or alternatively to the governor system of a turbine driven boiler feed pump to control turbine speed which in turn regulates feedwater flow.

Temperature controller TC receives signals from all or a part of each of the individual waterwall systems through selector switches SS. Maximum temperature from all waterwall evaporating systems is controlled in temperature controller TC and this signal is transmitted to relay RE1 to provide final feedwater flow adjustment so that feedwater flow restores temperature at the point of maximum temperature measurement to the control point. Throttling devices TD are provided in the individual waterwall systems so that the point or points of highest temperature measurement for controller TC may be adjusted to be in the superheat range while other systems or portions of systems are at saturation conditions.

Temperature controller TC also sends impulses to valves A at the discharge of the individual waterwall systems to balance flow between or among the various systems to hold the outlet control temperatures to a common control point or to fixed set differentials between or among control circuit set points.

The novel features of this system for controlling feedwater flow are (1) balancing flow between or among the individual waterwall systems to compensate for heat absorption variations is accomplished by means of valve A at the discharge of the individual waterwall systems from temperature measurements made in the individual systems and (2) total feedwater flow is controlled independently of balancing flow between or among the waterwall evaporating systems. Feedwater flow is controlled from first balancing feedwater and steam flows at time of change in flow rate and subsequently using highest waterwall system outlet control temperature as a final feedwater flow control element. Balancing flow between or among individual waterwall systems to compensate for variations in heat absorption is accomplished at the outlet of the waterwall systems before the flow enters the steam and water separator.

The individual action of each of valves A is such that valve A associated with the waterwall system having the highest temperature is in a fixed neutral point which is in the nearly wide or wide open position at the neutral point. Valve A for this highest temperature system will open to the fixed neutral point if its temperature is below the set point, and will open above the fixed neutral point if its temperature is above the set point. The valve/s A opening of the other waterwall system/s having lower control temperature as determined by controller TC, will open or close without reference to any specific valve position to bring the individual control measurements to the set point. Temperature controller TC has an auctioning device whereby the individual waterwall system having the highest control temperature will be the controller reference point for the entire system, where the entire system is controlled to the same set point. Where each parallel waterwall evaporating system has a separate steam and water separator at the outlet after valve A, steam and water separator water level may be a substitute or supplement for temperature measurement above.

Figure 11:
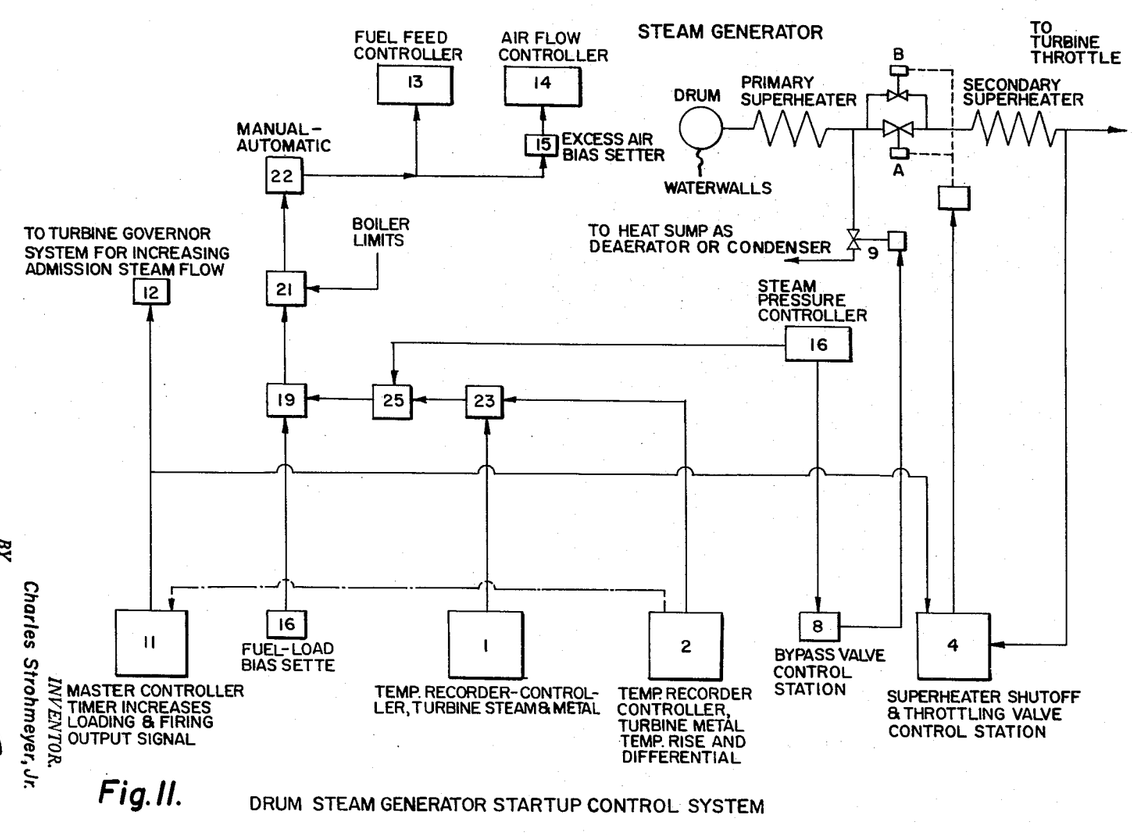

FIGURE 11 is an adaptation of the item 1, 2, and 3 system principles as they would apply to a drum steam generator. The drum steam generator does not need any minimum evaporating section discharge flow except what is required for cooling the superheater or reheater or both. Therefore, a flash tank is not required. When drum pressure decays after a shutdown, waterwall metal and water temperatures also decay with pressure. Considerable heat is necessary to raise the metal and water up to normal operating temperature. As heat is applied to the evaporating circuits over and above that required to generate steam, drum pressure increases. Therefore, when starting up a steam generator and raising drum pressure, the waterwall metal and contained water set as a heat sump. By firing the furnace at rates above evaporation requirements to raise drum pressure also increases heat input to the superheater in proportion to superheater steam flow. The added heat input raises superheater metal temperature.

Rate of superheater metal heating during start-up can be controlled by firing rate (heat input to the furnace in excess of evaporation requirements) up to the heat storage capacity of the evaporation circuits (raising drum pressure up to design working level). When drum pressure reaches normal working level firing rate must be decreased and maintained proportionate to evaporation. Heat input in the superheater for metal heating would be substantially reduced if firing rate were limited to sustain evaporation equal to superheater outlet steam flow. Extracting steam from the unit between the evaporation section outlet and the superheater outlet steam flow only and increase the heat input proportionate to flow for that portion of the superheater downstream of the extraction point. This results in metal temperature rise in the final superheater.

Thus, rise of secondary superheater metal temperature can be controlled, during start-up, first by increased firing rate with respect to steam flow to raise drum pressure, and second by increased firing rate with respect to superheater outlet steam flow as a result of extracting steam before the final superheater. Raising superheater metal temperature raises outlet steam temperature.

As steam pressure is raised at constant temperature, steam enthalpy (B.t.u./lb.) decreases. During low starting flows, the turbine nozzle chest pressure is very low and only a fraction of design pressure. Temperature drop across the turbine steam admission valves is a function of upstream pressure and temperature. To maximize steam temperatures in the turbine it is desirable to minimize throttling at the turbine inlet. Throttling system T before the superheater outlet satisfies this requirement. Temperature drop from throttling occurs at a point where additional heat can be added to the steam before it enters the turbine in the case where drum pressure is substantially above turbine nozzle chest pressure. Low pressure operation of the final superheater produces the maximum steam temperature in the turbine for any given superheater metal temperature. Thus, pressure reduction in the superheater minimizes the amount of superheater metal heating required during start-up to satisfy any given condition in the turbine.

Throttling and shutoff valve system T is common for both drum and once-through steam generators. In a drum boiler, the waterwalls act as a heat sump when raising steam pressure. The extraction of steam before the final superheater permits heat rejection to the condenser similar to item 2 above. The principles of item 3 apply to a drum steam generator. FIGURE 11 illustrates these pricinples.

The following startup sequence assumes that the turbine has been on turning gear and after an 8-hour shutdown, steam generator drum pressure has decayed to 800 p.s.i.g. and high pressure turbine metal temperatures are approximately equalized at 630 F. After lighting off the furnace, the superheaters are drained where possible, vented and heated. The turbine is sealed and vacuum is drawn on the condenser. Drum pressure is now approximately 1300 p.s.i.a.

The drains at the turbine throttle are opened. Valve B is opened and controller 4 is manually set to control throttle pressure at 500 p.s.i.a The steam temperature controls are manualy pre-set for the turbine metal temperature starting conditions. Master controller 11 is on manual. The turbine-generator is brought up to speed rapidly. The first stage exhaust steam temperature will drift. During rolling, turbine first stage exhaust steam temperature may be corrected by manually increasing or decreasing firing rate at controller 11, excess air at bias controller 15, or valve 9 by-pass flow at controller 8. When ready to synchronize, the drum pressure is 1600 p.s.i.a. A few minutes before synchronizing, master controller 11 is manually advanced anticipating flow increase after loading.

After synchronizing and transfer from throttle valve to governor valve control, master controller 11 is placed on automatic. Master controller 11 simultaneously sends a signal to the turbine governor 12 and firing system fuel and air controllers 13 and 14. The loading and firing rates may be biased through setter 16. Turbine loading and firing rates are increased by a timer in master controller 11. The rate of increase may be adjusted to a degree to suit metal temperature conditions at time of start-up.

Steam temperature decays after transfer from throttle valve to governor valve control. Controller 1 calls for an increase in steam temperature. It sends a signal to relay 19 which biases the signal from controller 11 to increase firing rate. Controller 2 limits the action of controller 1 through relay 23 when temperature rise or the differential temperature is too great. Variable ratio relay 19 is constructed so that the maximum increase in firing rate above the controller 11 signal is proportional to load increase. This protects against excessive firing. As drum pressure increases to the high limit set point, steam pressure controller 5 sends a signal to controller 8 which in turn opens by-pass valve 9. The high limit set point of controller 5 has been manually set to suit boiler water solids concentrations. As by-pass valve 9 reaches its maximum open position, relay 25 reduces the signal from relay 23 so that firing rate is controlled by the high limit set point of controller 5. Controller 8 is provided with a loading stop, so that the minimum closure of valve 9 can at all times be manually adjusted.

When controller 2 limits are exceeded, relay 23 will decrease the signal from controller 1, reducing the firing rate. By-pass valve 9 will close and pressure in the drum will fall as need be to sufficiently cool the primary steam supply to the turbine. Also, the timer in controller 11 is to prevent increase in output loading signal to the turbine governor and fuel firing systems.

After synchronization, throttle steam pressure controller 4 is placed on automatic. Controller 4 set point is programmed by controller 11 to gradually increase in proportion to generator load. Full pressure is reached slightly before ⅓ load except as limited by controller 5.

The above controls can be supplemented by manual or automatic control of gas recirculation, tilting burners, by-pass dampers, spray water or other by-pass arrangement to suit the boiler design in question.

Thus, it will be seen that I have provided an efficient and novel apparatus and a system which will reduce unit start-up time and costs of a steam generator as well as to provide the steam generator with capability to vary primary outlet steam temperature to control the rate of metal temperature rise or fall within the turbine during start-up and shutdown respectively; also I have provided a system for a once-through steam generator whereby start-up flow from the evaporating section and/or furnace waterwalls can be passed through a flash tank before entry to the superheater, the evaporating section and/or furnace water-walls being maintained at a higher pressure than the flash tank and superheater; additionally I have provided a novel system for increasing or decreasing heat input into the evaporating and/or furnace waterwall and superheating circuits with respect to a given superheater flow in a once-through steam generator during start-up for the purpose of raising or lowering superheater metal temperature and/or outlet steam enthalpy by means of recovering superheater bypass flow heat in the regenerative feedwater cycle or alternatively rejecting a part or all of such bypass flow heat to a heat sump as a condenser, in conjunction with the flash tank system and control of furnace firing rate for maintaining the flash tank pressure constant or to a programmed varying value; also I have provided a novel system for controlling steam generator primary outlet steam temperature during start-up using the above controls in conjunction with steam temperature measurement made within the turbine in a way which will control turbine metal temperature rise within specific limits; also I have provided as an alternative for the flash tank system mentioned above, and where a steam and water separator is installed after the evaporating section of a once-through steam generator, a system is provided whereby the flow to the steam and water separator during start-up may be throttled to a lower pressure than is maintained in the evaporating section.

While I have illustrated and described several embodiments of my invention, it will be understood that these are by way of illustration only, and that various changes and modifications may be made within the scope of the following claims.

I claim:

1. A system for controlling the operation of a once-through steam generating unit arranged to deliver superheated steam to a steam turbine, comprising a steam generating section and a superheater serially connected through conduit means, a firing means for providing a source of heat input to said generating section and said superheater, a throttling and shut-off valve connected in series between said generating section and at least a portion of said superheater, a control valve and flash tank located serially in a line by-passing said throttling and shut-off valve, and control means associated with said valves and said firing means operable to selectively reduce steam pressure downstream of said throttling and shut-off valve, to selectively regulate the operation of said firing means and the fluid flow from said flash tank to said superheater portion, to thereby control the turbine inlet steam temperature, turbine metal variations and temperature differential between the steam and turbine metal.

2. A system for controlling the operation of a once-through steam generating unit arranged to deliver superheated steam to a steam turbine, comprising a steam generating section and a superheater serially connected through conduit means, a throttling and shut-off valve connected in series between said generating section and at least a portion of said superheater, a control valve and flash tank located serially in a line by-passing said throttling and shut-off valve, and control means associated with the said valves operable to selectively reduce steam pressure downstream of said throttling and shut-off valve, to regulate the rate of turbine metal temperature change during start-up, shutdown and low load operation of the steam generating unit.

3. A high pressure steam-electric generating unit comprising a once-through type steam generator having a generating section and a superheater, a steam turbine driver powering electric generating means and having a high pressure turbine, conduit means serially connecting said generating section, superheater and high pressure turbine, a first continuous throttling valve located in said conduit means downstream of said generating section and upstream of at least a portion of said superheater and connected directly therebetween, a bypass conduit connected to said conduit means downstream of at least a portion of said generating section and upstream of said first valve, said bypass conduit including a second continuous throttling valve and a flash tank and including means for flowing fluid from the discharge of said second valve to said flash tank, steam conduit means connected between said flash tank and said superheater portion, said steam conduit means having flow control valve means, said flash tank being designed for a working pressure substantially below the coincident working pressure of said generating section throughout the period when flash tank steam is flowing to said superheater portion, control means including said first valve and said flow control valve means for gradually and uniformly increasing fluid flow through said first valve to said superheater portion at the working pressure of said flash tank, displacing steam flow to said superheater portion from said flash tank, for isolating said flash tank from said superheater portion at flash tank working pressure and for gradually opening said first valve for regulating pressure increase in said superheater portion above said flash tank working pressure up to the pressure which results when said first valve reaches its working open position, thereby minimizing thermal shock and overstress in the said superheater portion.

4. A high pressure steam-electric generating unit as recited in claim 3 wherein said control means flows steam from said flash tank to said superheater portion to said high pressure turbine to start rotating said turbine driver up to designed speed and flows steam from said generating section through said first valve at substantially reduced pressure downstream to said superheater portion and downstream conduit means to said high pressure turbine when initially loading said steam turbine driver.

5. A high pressure steam-electric generating unit as recited in claim 3 including a generating section recirculation system comprising a regenerative feedwater heating system including a condensate collection system, a high pressure feedwater pump and a high pressure feedwater heating system serially connected by fluid conduit means to the inlet of the said generating section, a water drain conduit and a steam overflow conduit from said flash tank, both of said conduits having flow control valve means and connecting to intermediate points of said regenerative feedwater heating system.

6. A high pressure steam-electric generating unit as recited in claim 5 including a heat sump as a condenser receiving exhaust steam from said turbine driver and serially connected by fluid conduit means to said condensate collection system, a second water drain conduit and a second steam overflow conduit from said flash tank, both of said second conduits having flow control valve means and connecting to said heat sump, a furnace having waterwalls which are a portion of said generating section, means for firing fuel in said furnace, and means for varying the superheater outlet steam temperature as a consequence of varying the rate of firing fuel and in conjunction with descharging a portion of the flash tank fluid flow in varying quantities to said regenerative feedwater heating system and said heat sump.

7. A high pressure steam-electric generating unit comprising a once-through type steam generator having a generating section and a superheater, a steam and water separator positioned therebetween, a steam turbine driver powering electric generating means, conduit means serially connecting said generating section, steam and water separator, superheater and turbine driver, separated steam flowing to said conduit means downstream of said steam and water separator, means for flowing separated liquid away from said steam and water separator, a power operated throttling valve means located in said conduit means between said generating section and said steam and water separator, and control means including said throttling valve means for reducing the fluid pressure to said superheater substantially below the generating section working pressure and gradually increasing fluid pressure to said superheater up to the working open position of said throttling valve means.

8. A high pressure steam-electric generating unit as recited in claim 7 including a generating section recirculation system comprising a regenerative feedwater heating system including a condensate collection system, a high pressure feedwater pump and a high pressure feedwater heating system serially connected by fluid conduit means to the inlet of the said generating section, and a water drain conduit and steam overflow conduit from said steam and water separator, both of said conduits having flow control valve means and connecting to intermediate points of said regenerative feedwater heating system.

9. A high pressure steam-electric generating unit as recited in claim 7 including parallel multiple units of said generating section, each having a portion of said throttling valve means in the said conduit means at its outlet and before said steam and water separator, a second control means including said portions of said throttling valve means to balance fluid flows through the respective parallel multiple units proportionate to the heat absorption in each by means of throttling action of the individual portions of said throttling valve means.

10. A high pressure steam-electric generating unit as recited in claim 8 including a heat sump as a condenser receiving exhaust steam from said turbine driver and serially connected by fluid conduit means to said condensate collection system, a second water drain conduit and a second steam overflow conduit from said steam and water separator, both of said second conduits having flow control valve means and connecting to said heat sump, a furnace having water walls which are a portion of said generating section, means for firing fuel in said furnace, means for varying the superheater outlet steam temperature as a consequence of varying the rate of firing fuel and in conjunction with discharging a portion of the steam and water separator fluid flow in varying quantities to said regenerative feedwater heating system and said heat sump.

11. A high pressure steam-electric generating unit as recited in claim 9 including a third control means for regulating total fluid flow parallelly and simultaneously to all said parallel multiple units as a unit.

12. A steam-electric generating unit comprising a once-through type of steam generator having a generating section and a superheater, a steam turbine driver powering electric generating means, conduit means serially connecting said generating section, superheater and steam turbine driver, a flow circuit connected between said generating section and at least a portion of said superheater, said flow circuit including throttling valve means and including a steam and water separator directly downstream of said throttling valve means, separated steam flowing in said flow circuit downstream of said steam and water separator, means for conducting separated liquid away from said steam and water separator, control means including said throttling valve means for reducing the fluid pressure in said superheater portion substantially below the generating section working pressure, whereby said turbine driver may be started up and initially loaded with essentially dry steam from said steam and water separator after substantial pressure reduction through said throttling valve means while continuously removing separated liquid from said steam and water separator.

References Cited by the Examiner
UNITED STATES PATENTS

| | | | |
|---|---|---|---|
| 1,703,228 | 2/1929 | French | 60—106 X |
| 1,967,755 | 7/1934 | Junkins | 60—105 |
| 2,116,587 | 5/1938 | Toensfeldt | 60—105 |
| 2,193,863 | 3/1940 | Egloff | 60—105 X |
| 2,204,139 | 6/1940 | Knowlton | 60—105 X |
| 2,243,944 | 6/1941 | Donaldson | 60—105 |
| 2,962,865 | 12/1960 | Buri | 60—106 X |
| 2,982,192 | 5/1961 | Profos | 60—107 X |
| 3,008,295 | 11/1961 | Profos | 60—107 X |

SAMUEL LEVINE, *Primary Examiner.*
ROBERT R. BUNEVICH, *Examiner.*